July 2, 1968 P. C. SHERBURNE 3,390,854

MOVABLE BEARING SUPPORT

Filed Oct. 28, 1966

INVENTOR.
PHILIP C. SHERBURNE
BY *Herman Foster*
ATTORNEY

United States Patent Office 3,390,854
Patented July 2, 1968

3,390,854
MOVABLE BEARING SUPPORT
Philip C. Sherburne, East Providence, R.I., assignor to Grinnell Corporation, Providence, R.I., a corporation of Delaware
Filed Oct. 28, 1966, Ser. No. 590,268
5 Claims. (Cl. 248—55)

This invention relates to slidable supports for long structural members such as beams or pipes subject to movement.

In structures such as bridges, power plants or chemical plants containing large piping installations, some of the components are frequently subjected to forces that require movement of the components in order to prevent an excessive stress build-up. These forces can result from a change in temperature or the movement of an element to which the component in question is related.

To facilitate the movement referred to above, it has become customary to utilize devices which seek to decrease the friction between the component and its support. An example of such friction reducing devices are rollers. These, however, are not universally acceptable. Therefore, for some applications it has been found that a friction reducing plate, often referred to as a bearing plate is more desirable. It is in connection with a bearing plate construction with which my invention is particularly concerned.

In my copending application Ser. No. 543,863 filed Apr. 20, 1966 there is described a bearing plate construction which permits the easy movement of a structural member such as a pipe in a longitudinal or transverse direction in a single plane. Such motion is further facilitated by the use of an anti-friction material such as reinforced polytetrafluoroethylene, a material known also as TFE and often sold under the name Teflon. While the construction described in this copending application is susceptible of many and wide uses it lacks an advantage which the present invention by its improved construction supplies.

A primary defect in the construction illustrated in my copending application S.N. 543,863 is that while longitudinal and transverse movement is permissible there is no provision for a change in angular orientation. Very often a long structural member such as a pipeline, during the many changes caused by temperature variations in the pipeline, not only must move sideways or lengthwise, but also to accommodate these movements must pivot slightly at various particular portions, thereby changing the angular orientation of these portions of the pipeline.

The present invention contemplates the use of a reinforced Teflon coated flat cylindrical member confined between two slide members to permit longitudinal, transverse and angular motion in a single plane at a supported portion of a structural member.

Because of the cold flow characteristics of TFE, it has been found that a loaded bearing plate supported for a prolonged period by a TFE pad on a supporting base will cause the pad to become indented if an edge of the bearing plate is in contact with the pad. Should movement then be required of the plate and the structural component to which it is joined, in a direction toward the exposed portion of the pad, much larger starting forces would be required to overcome the uphill friction between the plate and the pad then if no indentation had occurred. This can result in an undesirable stress increase in the structural component. In my copending application S.N. 543,863 this disadvantage has been overcome by proportioning the bearing and support plates so that an edge normally does not come in contact with the TFE.

This advantage is incorporated in the present novel construction which contains all the advantages of the prior construction of my copending application and in addition has the further advantage of providing for an angular movemet of the structural component in the same plane as the longitudinal and transverse movement.

Other objects and advantages of the invention will become apparent from the following description and accompanying drawing which describe and show for illustrative purposes only, a preferred embodiment of the invention.

Figure 1:
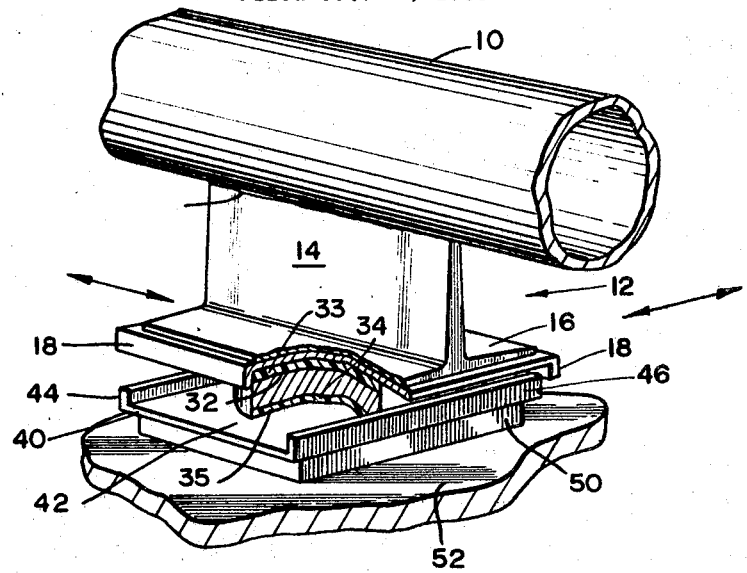
FIG. 1 is a perspective view of a preferred form of my novel construction showing the relationship of all of the components and in which the structural component is represented by a pipe, and in which portions have been cut away to clarify details.
Figure 2:
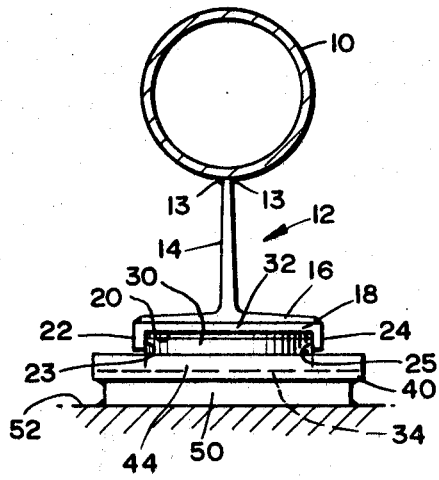
FIG. 2 is an end elevation view of the construction shown in FIG. 1.
Figure 3:
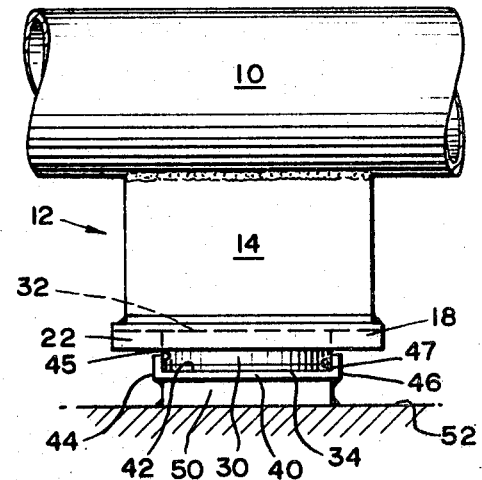
FIG. 3 is a side elevation view of the construction shown in FIG. 1.

Referring to the drawing in greater particularity, 10 indicates a steel pipe, as one form of structural component, which, for purposes of example, may be considered a steam carrying part of a power plant. Fastened to the bottom exterior of the pipe is a steel member, generally indicated by 12 and often referred to in the art as a stool. This stool 12 has an inverted T-shape in cross-section and is composed of a vertical web 14 joined at its upper edge by welds 13 to pipe 10 and terminating at its bottom edge in an integral flange member 16 perpendicular to the web. The lower flat face of flange 16 is joined to a longitudinally extending channel member 18.

The member 18, acts as a top bearing plate and has a downwardly facing slide channel which is composed of a smooth flat polished surface 20 and two parallel downwardly directed spaced walls 22 and 24 which are integral with the sides of the flat surface 20. These walls each have a smooth inwardly facing polished flat surface at right angles to the surface 20. These wall surfaces are indicated as 23 on wall 22, and 25 on wall 24.

Beneath the channel member 18 and at right angles thereto is a second channel member 40 which acts as a bottom bearing plate and has an upwardly facing slide channel which is composed of a smooth flat polished surface 42 and two parallel upwardly directed spaced walls 44 and 46 which are integral with the sides of the flat surface 42. These walls each have a smooth inwardly facing polished flat surface at right angles to the surface 42. These wall surfaces are indicated as 45 on wall 44 and 47 on wall 46.

Beneath the channel member 40 and supporting the same is a base support plate 50 which normally is part of, or joined to, the building structure 52.

Interposed between the two channel shaped bearing plates 18 and 40 is a cylindrically shaped slide member 30 having flat parallel top and bottom surfaces, 32 and 34 respectively. These top and bottom surfaces are perpendicular to the axis of the cylinder 30. The diameter of the cylinder is preferably slightly less than the distance between wall surfaces 23 and 25 and surfaces 45 and 47. For special purposes the channels and cylinder may be dimensioned so that the cylinder is in contact with all four wall surfaces.

Bonded to each of the top and bottom flat surfaces 32 and 34 is a continuous uniform coating of friction reducing material. An example of a suitable coating is a uniform sheet of TFE reinforced with an abrasion resistant material and sold under the name Rulon. These sheets are indicated as 33 for the top surface and 35 for the bottom surface and are preferably permanently bonded to their respective surfaces.

The widths of channel bearing plates 18 and 40 will be determined by the diameter of the cylindrical slide member 30. The diameter of member 30 is controlled by the load to be supported and the load bearing capacity of the TFE coating which is considerably less than the bearing capacity of steel. Under normal conditions contemplated here, the reinforced material Rulon can withstand 500 p.s.i. pressure. Therefore, if it is assumed that there is a load of 18,000 lbs. to be transmitted from pipe 10 to base support plate 50, then the required diameter of cylindrical slide member 30 would be obtained as follows:

$$\frac{\text{Total load}}{\text{Allowable pressure}} = \text{required area} = \frac{\pi d^2}{4}$$

where $d$ = diameter of cylinder $$\frac{18000 \text{ lbs.}}{500 \text{ lbs./in.}^2} = 36 \text{ in.}^2 = \frac{\pi d^2}{4}$$

$$\frac{144}{\pi} = d^2 = 45.86$$

$$d = 6.77''$$

For ease of manufacture it would be desirable to select the cylinder slide member from commercial bar stock. Accordingly, in a case such as the sample above, the cylinder slide member 30 would be made 7" in diameter.

As stated previously it is most desirable to have some clearance between the cylinder slide member and the side walls of the channels in which it is contained. Therefore channel members 18 and 40 would be chosen to provide a transverse dimension of 7 1/32" between their respective sidewall surfaces 23, 25 and 45, 47. The thickness of the channel members and their sidewalls would be determined by standard structural design considerations and need not be gone into here.

It is contemplated that the cylinder slide member 30 will normally be contained at the approximate centers of channel members 18 and 40.

To achieve the desired goal of not having a channel edge in contact with either of the TFE coatings 32 and 34 the total lengths of the channels 18 and 40 is determined by the expected travel along each channel plus a suitable added factor of safety. Thus, if it is expected that pipe 10 will move 5 inches longitudinally in either direction, normally due to expansion and contraction, and that 10% is a reasonable factor of safety, the total length of channel member 18 will be 5 inches plus 1/2 inch plus 7 inches for cylinder slide member 30 plus 5 inches plus 1/2 inch or a total of 18 inches.

Further, if it is expected that pipe 10 will move 2 1/2 inches transversely, in either direction, normally due to forces imposed on this portion of the pipe, and that 10% is a reasonable factor of safety, the total length of channel member 40 will be 2 1/2 inches plus 1/4 inch plus 7 inches for cylinder slide member 30 plus 2 1/2 inches plus 1/4 inch, or a total of 12 1/2 inches.

Figure 4:
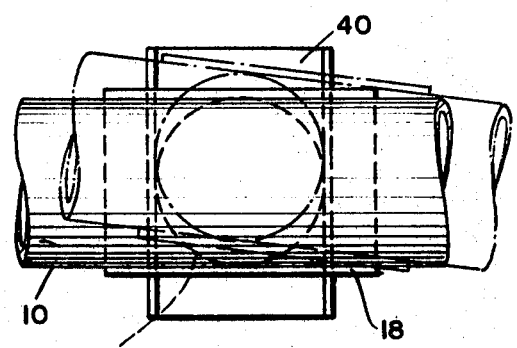
FIG. 4 is a diagrammatic representation viewed from above and illustrating the accommodation of some of the numerous angular orientations which can be accommodated by the present invention.

Inherent in the present construction is the additional ability of the pipe to rotate about the vertical axis of cylinder slide member 30, as shown in FIG. 4, thereby preventing any excess buildup of torsional stresses in this portion of pipe 10.

It will be understood that the present construction contemplates that the outer ends of flat surface 20 and flat surface 42 will never come in contact with the respective uniform coatings on surfaces 32 and 34.

It is preferred that the coatings 33 and 35 be as thin as is practical. Since the cylinder slide member 30 is normally expected to be made of unground hot rolled steel it has been found that sheets of Rulon in the order of a thickness of .010 inch will, when bonded to surfaces 32 and 34, be thick enough to overcome inequalities in the steel surfaces and thin enough to normally withstand excessive cold flow due to the pressure imposed by the flat surfaces 20 and 42.

It is thus seen that the present construction will facilitate movement of the pipe 10 in any horizontal direction with ease and without the prospect of requiring large initial forces to be overcome due to any embedment into the plastic facing used in this construction. In addition any prospective buildup of torsional stresses in this portion of the pipe will be prevented by a rotational change in angular orientation of the pipe at the support which acts to relieve such stresses.

What I claim and desire to secure by Letters Patent is:

1. A support construction for a portion of a structural member subject to movement due to force imposed on said portion, said support construction comprising:
   (a) an elongated member bearing plate joined to and beneath said structural member parallel to said structural member,
      (I) having two ends and a smooth flat bearing surface facing away from said structural member,
   (b) an elongated base bearing plate adapted to be joined to a support structure, said base bearing plate,
      (I) being oriented at right angles to said member bearing plate
      (II) having two ends and a smooth flat bearing surface facing toward said structural member,
   (c) a short cylinder member
      (I) having a flat smooth upper end face at right angles to the axis of said cylindrical member, said upper end face,
         (A) having a substantially uniform sheet composed essentially of polytetrafluoroethylene bonded to said face and being in contact with said smooth flat bearing surface of said member bearing plate
      (II) having a flat smooth lower end face parallel to said upper end face, and,
         (A) having a substantially uniform sheet composed essentially of polytetrafluoroethylene bonded to said face,
         (B) being in contact with said smooth flat bearing surface of said member bearing plate,
   (d) means extending from one of said member bearing plate and said flat smooth upper end face for guiding and retaining said cylinder slide member relative to said member bearing plate,
   (e) means extending from one of said base bearing plate and said flat smooth lower end face for guiding and retaining said cylinder slide member relative to said base bearing plate,
   (f) said member bearing plate being of a length and location such that its two said ends are always outside the edges of said upper end face,
   (g) said base bearing plate being of a length and location such that its two said ends are always outside the edges of said lower end face.

2. A support construction as called for in claim 1 wherein said elongated member bearing plate is joined to and beneath said structural member in spaced parallel relation.

3. A support construction as called for in claim 1 wherein:
   (a) said extending means from one of said member bearing plate and said flat smooth upper end face are two parallel downwardly directed spaced walls integral with the sides of said smooth flat member bearing plate surface to form a channel,
   (b) said extending means from one of said base bearing plate and said flat smooth lower end face are two parallel upwardly directed spaced walls integral with the sides of said smooth flat base bearing plate surface to form a channel.

4. A support construction as called for in claim 3 wherein:
  (a) said downwardly directed spaced walls have inwardly facing flat surfaces at right angles to said smooth flat member bearing plate surface
  (b) said upwardly directed spaced walls have inwardly facing flat surfaces at right angles to said smooth flat base bearing plate surface.

5. A support construction for a portion of a pipe subject to movement due to force imposed on said portion, said support construction comprising:
  (a) an elongated support stool joined in longitudinal relation to and beneath said pipe, said stool comprising:
    (I) a vertical flat web having an upper edge and a lower edge joined at its upper edge to and beneath said pipe,
    (II) a flat flange joined to and extending from the lower edge of said web at right angles to said web, and having a flat lower face,
    (III) an elongated channel member joined to said flat lower face and including:
      (A) a downwardly facing open slide channel having a smooth downwardly facing polished back surface with two ends and sides, and
      (B) two parallel downwardly directed spaced walls integral with the sides of said back surface,
  (b) an elongated base bearing plate shaped as an upwardly facing channel member adapted to be joined to a support structure, said channel shaped base bearing plate,
    (I) being oriented at right angles to said stool channel member in a plane substantially parallel to said back surface,
    (II) including, an upwardly facing open slide channel having a smooth flat upwardly facing polished back surface with two ends and sides,
    (III) including, two parallel upwardly directed spaced walls integral with the sides of said upwardly facing back surface,
  (c) a short cylindrical member interposed between said downwardly facing and upwardly facing back surfaces and having an axis at right angles to said surfaces, said cylindrical member,
    (I) having a flat smooth upper end face at right angles to the axis of said cylindrical member, said upper end face,
      (A) having a substantially uniform sheet composed essentially of polytetrafluoroethylene bonded to said face
      (B) being in contact with said smooth flat downwardly facing polished back surface and
      (C) being contained between said two parallel downwardly directed spaced walls
    (II) having a flat smooth lower end face parallel to said upper end face, said lower end face,
      (A) having a substantially uniform sheet composed essentially of polytetrafluoroethylene bonded to said lower face,
      (B) being in contact with said smooth flat upwardly facing polished back surface and,
      (C) being contained between said two parallel upwardly directed spaced walls.

References Cited

UNITED STATES PATENTS

| | | | |
|---|---|---|---|
| 1,425,320 | 8/1922 | Drake | 14—16 |
| 1,911,485 | 5/1933 | Axlund | 248—55 |
| 3,349,418 | 10/1967 | Hein | 14—16 |

ROY D. FRAZIER, *Primary Examiner.*

J. FRANKLIN FOSS, *Assistant Examiner.*